US008710979B2

(12) United States Patent
Frederick

(10) Patent No.: US 8,710,979 B2
(45) Date of Patent: Apr. 29, 2014

(54) PERSONAL ALARM DEVICE FOR HEADWEAR FOR PROXIMITY DETECTION

(75) Inventor: Larry D. Frederick, Huntsville, AL (US)

(73) Assignee: Strata Proximity Systems, LLC, Pittsburgh, PA (US)

( * ) Notice: Subject to any disclaimer, the term of this patent is extended or adjusted under 35 U.S.C. 154(b) by 469 days.

(21) Appl. No.: 12/491,772

(22) Filed: Jun. 25, 2009

(65) Prior Publication Data

US 2009/0322512 A1 Dec. 31, 2009

Related U.S. Application Data

(60) Provisional application No. 61/129,418, filed on Jun. 25, 2008.

(51) Int. Cl.
*G08B 1/08* (2006.01)

(52) U.S. Cl.
USPC ............ 340/539.11; 340/539.23; 340/539.26; 340/552; 340/567; 340/686.6

(58) Field of Classification Search
USPC .......... 340/539.11, 539.23, 539.26, 552, 567, 340/686.6
See application file for complete search history.

(56) References Cited

U.S. PATENT DOCUMENTS

| | | | |
|---|---|---|---|
| 3,993,407 A * | 11/1976 | Moricca et al. | 356/3.14 |
| 6,170,607 B1 | 1/2001 | Freeman et al. | |
| 6,208,260 B1 | 3/2001 | West et al. | |
| 6,232,887 B1 * | 5/2001 | Carson | 340/903 |
| 6,288,651 B1 | 9/2001 | Souza | |
| 6,810,353 B2 * | 10/2004 | Schiffbauer | 702/159 |
| 6,856,578 B2 | 2/2005 | Magine et al. | |
| 7,015,812 B1 * | 3/2006 | Lemchen | 340/541 |
| 7,205,894 B1 * | 4/2007 | Savage | 340/568.6 |
| 7,420,471 B2 * | 9/2008 | Frederick et al. | 340/572.7 |
| 7,876,213 B2 * | 1/2011 | Angelo et al. | 340/539.11 |
| RE42,218 E * | 3/2011 | Magine et al. | 367/134 |
| 2002/0140393 A1 | 10/2002 | Peless et al. | |
| 2006/0087443 A1 | 4/2006 | Frederick et al. | |
| 2009/0038056 A1 | 2/2009 | Bobbin et al. | |
| 2009/0180279 A1 | 7/2009 | Bobbin et al. | |

FOREIGN PATENT DOCUMENTS

| | | |
|---|---|---|
| CN | 2549774 Y | 5/2003 |
| EP | 1 510 403 A2 | 3/2005 |

* cited by examiner

*Primary Examiner* — Steven Lim
*Assistant Examiner* — Hongmin Fan
(74) *Attorney, Agent, or Firm* — Dickstein Shapiro LLP

(57) ABSTRACT

Embodiments described herein relate to an apparatus for attaching elements of a magnetic field safety system to headwear worn by a worker. In various embodiments, the headwear includes a combination of a sounder device, light assembly, personal alarm device and power source.

32 Claims, 10 Drawing Sheets

PERSONAL ALARM DEVICE FOR HEADWEAR FOR PROXIMITY DETECTION

CROSS-REFERENCE TO RELATED APPLICATIONS

This application claims the benefit of U.S. Provisional Application No. 61/129,418, filed on Jun. 25, 2008, the subject matter of which is incorporated in its entirety by reference herein.

BACKGROUND

The present invention relates generally to safety systems at work sites, and in particular to personal alarm devices (PADs) for use with an interactive magnetic marker field and proximity warning system. Many methods have been devised to protect people from being struck, pinched, crushed or otherwise harmed by vehicles and mobile equipment. Such vehicles and mobile equipment may be used for above and below ground operations. Examples of the equipment include: road construction equipment such as trucks, road graders, rollers and pavers; surface mining equipment, such as for use with gravel and sand operations, front end loaders, trucks, dozers, conveyors and other items; underground mining equipment such as continuous miners, shuttle cars, conveyors, crushers, load-haul-dump vehicles, man-trips, tractors, and other items. The equipment also includes fork lifts, cranes, and trucks used at warehouses and shipping ports.

The invention is particularly applicable to work sites that require personnel to be in close proximity to various hazardous elements, such as machines, mobile equipment, remotely controlled machines, and operated vehicles. Such work environments may include locations that are inherently dangerous and should be avoided or entered only with great caution. Examples of such work environments are surface mining, underground mining, sand and gravel operations, road construction, warehouses, shipping docks, coke plants, etc. Hundreds of people are killed each year in the U.S. in such work environments. Workers are sometimes struck, pinched, crushed or otherwise harmed while performing their jobs in such environments. Collisions between the various elements at the work sites need to be avoided also to avert property damage.

Referring now to FIG. 1, there is illustrated a simplified example of a work site in which a proximity detection system is implemented. FIG. 1 shows a truck 304 on which a magnetic field generator 81 is mounted. The magnetic field generator 81 generates a magnetic field 92 that surrounds the truck 304. The edge of the magnetic field 92 generated by the magnetic field generator 81 corresponds to the border of a Warning or Danger Zone surrounding the truck 304. A worker 301 within the boundary of the Warning or Danger Zone 92 is in potential danger from being struck or otherwise injured by the truck 304. The worker 301 carries a personal alarm device 60. If the worker 301 and, correspondingly, the personal alarm device 60 are within the magnetic field 92 created by the magnetic field generator 81, the personal alarm device 60 detects the presence of the magnetic field 92 and issues a visual or audio warning. In embodiments of the magnetic field warning system, as detailed in U.S. patent application Ser. No. 11/984,824, which is incorporated herein by reference in its entirety, multiple magnetic filed generators 81 may be used to generate Warning and Danger Zones having a complex shape around the truck 304 or other equipment or areas. These zones may be adjusted in both size and shape. In addition, safe zones may be designated near the truck 304 in which a personal alarm device 60, while within the magnetic field 92, does not generate a warning signal to the worker 301.

FIG. 2 is a diagram of the personal alarm device 60 and the magnetic field generator 81 of the proximity detection system of FIG. 1. A magnetic field generator 80 is contained within a housing 81 and includes an amplifier 84 connected to a ferrite core 90, inductor 86 and capacitor 88. In addition, the magnetic field generator 80 is connected to a power source 83 that provides the power to operate the magnetic field generator 80. The amplifier 84 is connected to and controlled by a controller 82. The ferrite core 90, inductor 86 and capacitor 88 generate a magnetic field 92 in response to an input voltage from the amplifier 84. The amplifier 84 is controlled by the controller 82 which controls the voltage and current outputs of the amplifier 84. The controller 82 is also connected to a receiver 96 and warning system 98. The receiver 96 is connected to an antenna 94 which receives an input signal 76 from a personal alarm device 60. The antenna 94 conveys the signal 76 to the receiver 96 which passes the signal 76 to the controller 82. Upon receiving the signal 76 from the personal alarm device 60, the controller 82 directs the warning system 98 to issue a warning. In one embodiment, the warning system 98 may issue an audio and/or visual warning. In another embodiment, the warning system 98 may be capable of terminating the operation of a vehicle to which the warning system 98 is mounted, for example, the truck 304 of FIG. 1. The magnetic field generator 80 may also be mounted in a location in which it is desirable to warn a worker carrying a personal alarm device 60 of their proximity to the location.

The personal alarm device 60 has x, y, and z axis magnetic field antennas 62 that sense the magnetic field 92 produced by the magnetic field generator 80. The sensed magnetic field signal 80 is passed through filters 66 and an amplifier 68 to a signal detector 64. The signal detector 64 then passes information about the detected signal to a controller 70. The controller 70 activates a transmitter 72 which transmits a corresponding response signal 76 to the magnetic field 92 through an RF antenna 74. In one embodiment, the response signal 76 is an RF signal. The personal alarm device 60 is powered by power source 71. The personal alarm device 60 is carried by the worker 301 (FIG. 1) in order to provide the worker with a warning of their proximity to a magnetic field generator 80.

It has been found however, that existing personal alarm devices have not been worn or used effectively by workers. One issue is that workers are resistant to wearing devices that are bulky, uncomfortable to wear, and are located where they get in the way of the worker's activities. Existing personal alarm devices are typically placed in the pocket or onto a belt of a worker. As such, sounds emitted by the personal alarm devices may not be heard in a noisy environment. Moreover, visual indicators, such as lights, may not be seen by the worker to alert the worker of impending danger. What is needed, is a personal alarm device configured to be worn by a worker such that any signal—audio, visual, or both—transmitted by the personal alarm device will be readily and quickly recognized by the worker. Also needed is a personal alarm device that is miniaturized so as not to be obtrusive or uncomfortable when worn by the worker.

SUMMARY

In one embodiment described herein, a personal alarm device includes a controller, and a warning device electrically coupled to the controller, the warning device including a sounder device adapted to be positioned proximate to a worker's ear.

In another embodiment described herein, a personal alarm device includes a controller, and a warning device electrically coupled to the controller, the warning device including a visual indicator positioned proximate to a worker's line of sight.

In another embodiment described herein, a safety system includes a magnetic field generator, and a personal alarm device. The personal alarm device includes an antenna configured to detect a magnetic field, a controller electrically coupled to the antenna, and a warning device electrically coupled to the controller. The warning device includes a sounder device adapted to be positioned proximate to the worker's ear, and a visual indicator adapted to be positioned proximate to the worker's line of sight.

In another embodiment described herein, a method of warning a worker of danger includes generating a magnetic field using a magnetic field generator, detecting the presence of the magnetic field using a personal alarm device worn by the worker, wherein the personal alarm device comprises a sounder device arranged proximate to the worker's ear and a visual indicator arranged proximate to the worker's line of sight, and activating the sounder device and visual indicator light assembly to provide the worker a warning when the personal alarm device detects the magnetic field The above and other advantages and features of the invention will be more clearly understood from the following detailed description which is provided in connection with the accompanying drawings.

DETAILED DESCRIPTION OF PREFERRED EMBODIMENTS

In the following detailed description, reference is made to the accompanying drawings which form a part hereof, and in which are shown by way of illustration specific embodiments that may be practiced. These embodiments are described in sufficient detail to enable those of ordinary skill in the art to make and use them, and it is to be understood that structural, logical, or procedural changes may be made to the specific embodiments disclosed herein.

Figure 3:
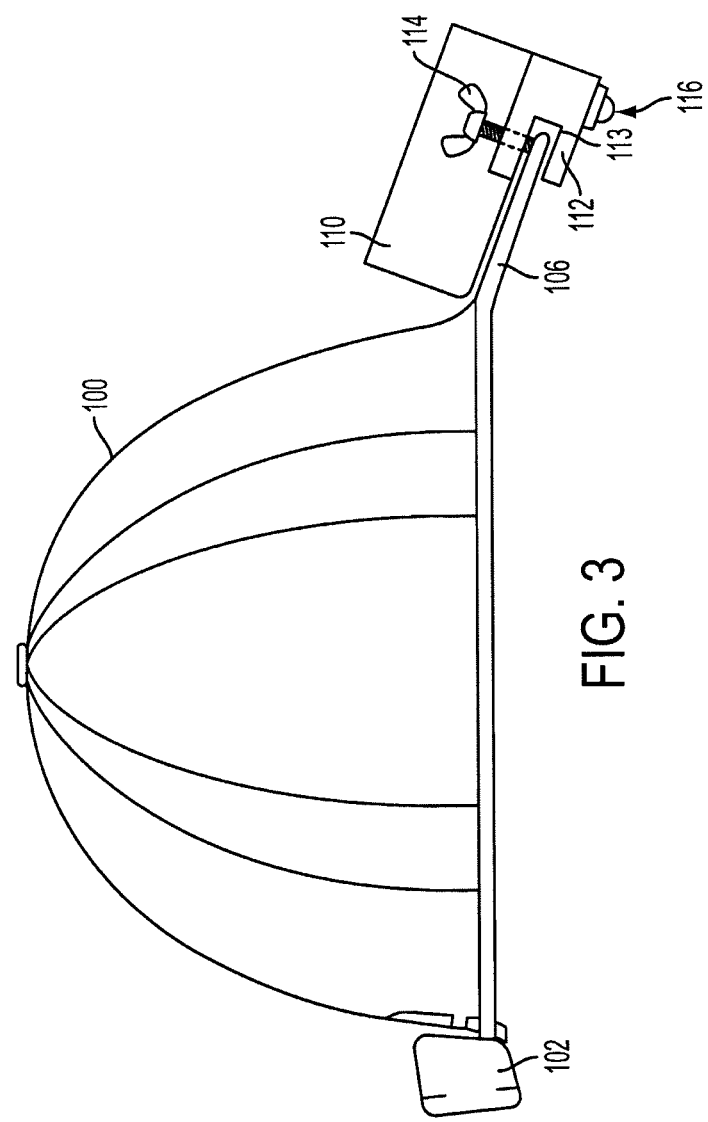
FIG. 3 is a diagram of a personal alarm device mounted on a hard hat in accordance with an embodiment described herein.

With reference to FIG. 3, there is shown an exemplary embodiment of a hard hat 100 that is worn by a worker in an operational environment. The hard hat 100 may instead be any other suitable headwear, including a helmet, sports hat, baseball cap, head band, winter hat, visor, or other type of headwear. The front end of the hat 100 shown in FIG. 3 has a bill or visor (brim) 106 on which a personal alarm device 110 is mounted. In various embodiments of the invention, the personal alarm device 110 may be mounted in the center of the brim 106, towards the side of the brim 106, or in other locations on the brim 106 of the hat 100. The personal alarm device 110 includes a warning device, such as a visual indicator 116, which can include light indicators, such as LED's, a screen, such as an LCD screen, or other visual indicators. As shown in the embodiment of FIG. 3, the personal alarm device 110 is located on the brim 106 of the hat 100 such that the light indicators 116 are visible to a worker wearing the hat 100. In other embodiments, the visual indicator 116 may be located remotely from the personal alarm device 110. As shown in FIG. 3, the personal alarm device 110 may be mounted or attached to the brim 106 of the hat 100 by an attachment means. In one embodiment, the attachment means may be a clip 112 having one or more thumbscrews 114. The clip 112 has a slot 113 that fits over the brim 106 of the hat 100. The thumbscrew 114 may be tightened to secure the clip 112 and personal alarm device 110 to the brim 106. In another embodiment, the clip 112 may be spring loaded. To attach the spring loaded clip to the hat 100, a worker would merely need to open the clip and allow the clip to close on the brim 106 of the hat 100. In addition to the clip 112, the attachment means may be an adhesive, hook and loop fastener, tape, bolt, or other suitable means of attachment.

In other embodiments, the personal alarm device 110 including the visual indicator 116 or the remote visual indicator 116 may be mounted on a worker at a location such that the visual indicators 116 are proximate to a line of sight of the worker. The term "proximate to a line of sight" is defined as a location in which the visual indicator will be visible to a worker's direct vision or peripheral vision, and may include, for example, locations such as a worker's neck or a collar of the worker's shirt, a worker's shoulder, a worker's chest or shirt, the worker's wrist, a worker's headwear, a worker's glasses or goggles, a stalk or swivel mounted on a worker, or anywhere else on the worker's person that is easily and readily visible. In various embodiments, the personal alarm device 110 or a remote visual indicator 116 could be attached to the worker by such devices as a necklace, a wrist band, glasses, goggles, a collar clip, a shirt clip, a shoulder strap, and the like.

As shown in FIG. 3, a warning device including an audible sounder 102 is located remotely from the personal alarm device 110 at the back of the hat 100 and is attached to the personal alarm device 110 by a ribbon cable. The sounder 102 may include such devices that produce an audible warning such as a horn, a buzzer, a bell, a speaker, or other devices. The sounder 102 is preferably positioned such that sound is projected downward and toward the worker's ears. Alternatively, the sounder 102 may be located inside the hat 100. In one embodiment, the sounder 102 may be mounted to the side of the hat 100 directly above a worker's ears. In another embodiment, the sounder 102 may be incorporated into the personal alarm device 110 such that the personal alarm device 110 and sounder 102 are one unit. In another embodiment, the sounder 102 may not be mounted on headwear at all.

In other embodiments, the personal alarm 110 device including the sounder 102 or a remote sounder 102 may be mounted on a worker at a location such that the sounder 102 is located proximate to the worker's ear. The term "proximate to a worker's ear" is defined as a location in which the sounder 102 will have a direct and unobstructed path to the worker's ear and may include, for example, locations such as a worker's neck or a collar of the worker's shirt, a worker's shoulder, a worker's chest or shirt, the worker's wrist, a worker's headwear, a worker's glasses or goggles, a stalk or swivel mounted on a worker, or anywhere else on the worker's person that has an unobstructed path to a worker's ear. In various embodiments, the personal alarm device 110 or remote sounder 102 could be attached to the worker by such devices as a necklace, a wrist band, glasses, goggles, a collar clip, a shirt clip, a shoulder strap, and the like.

Figure 4:
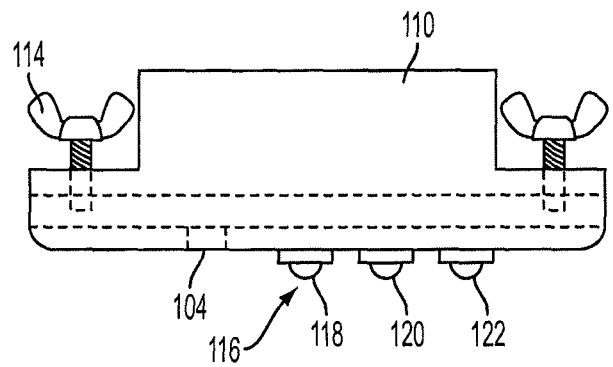
FIG. 4 is a side-view of the personal alarm device of FIG. 3.

FIG. 4 is a side-view of the personal alarm device 110 of FIG. 3. In the embodiment shown in FIG. 4, the personal alarm device 110 may have two thumbscrews 114 for attaching the personal alarm device 110 to the hat 100. The personal alarm device 110 has a visual indicator 116, also called a light assembly. The visual indicator 116 has three light indicators 118, 120 and 122. In one embodiment, the light indicators 118, 120 and 122 may be blue, yellow and red, respectively. In use, the blue light indicator 118 indicates power and/or satisfactory status, the yellow light indicator 120 indicates a warning signal, and the red light indicator indicates a danger signal. Alternatively, the personal alarm device 110 can have just one light indicator 118, 120 or 122. In use, the one light indicator flashes at different rates to indicate status as follows: a slow-rate flash indicates power and/or satisfactory status; a medium-rate flash indicates a warning signal; and a fast-rate flash indicates a danger signal. The personal alarm device 110 shown in FIG. 4 also has an integrated audible sounder 104 for emitting an audible alarm during warning and/or danger conditions. The integrated audible sounder 104 may be used in combination with or in place of the audible sounder 102 shown in FIG. 3.

Figure 5:
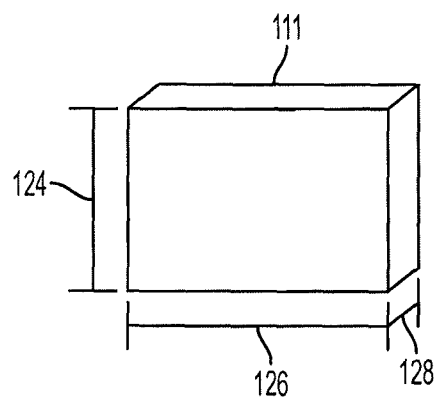
FIG. 5 is a diagram displaying the dimensions of the personal alarm device of FIG. 3.

FIG. 5 is a diagram displaying the dimensions of a personal alarm device 111 in accordance with an embodiment described herein. The preferable size for the personal alarm device 111 using current components is shown in FIG. 5. It should be appreciated that the current preferable size of the personal alarm device 111 is only one example and that the size could be adjusted based on smaller available electronic components or other preferences. In one embodiment, the personal alarm device 111 has an overall length 124, an overall width 126, and an overall thickness 128. Preferably, the length 124 is approximately 2 inches, the width 126 is approximately 3 inches, and the thickness 128 is approximately 0.75 inches. When attached to the hat 100, the length 124 is the front to back dimension, and the width 126 is the left to right (across the brim 106) dimension. With such dimensions, the personal alarm device 111 is sufficiently miniaturized to unobtrusively fit onto the hat 100.

Figure 6:
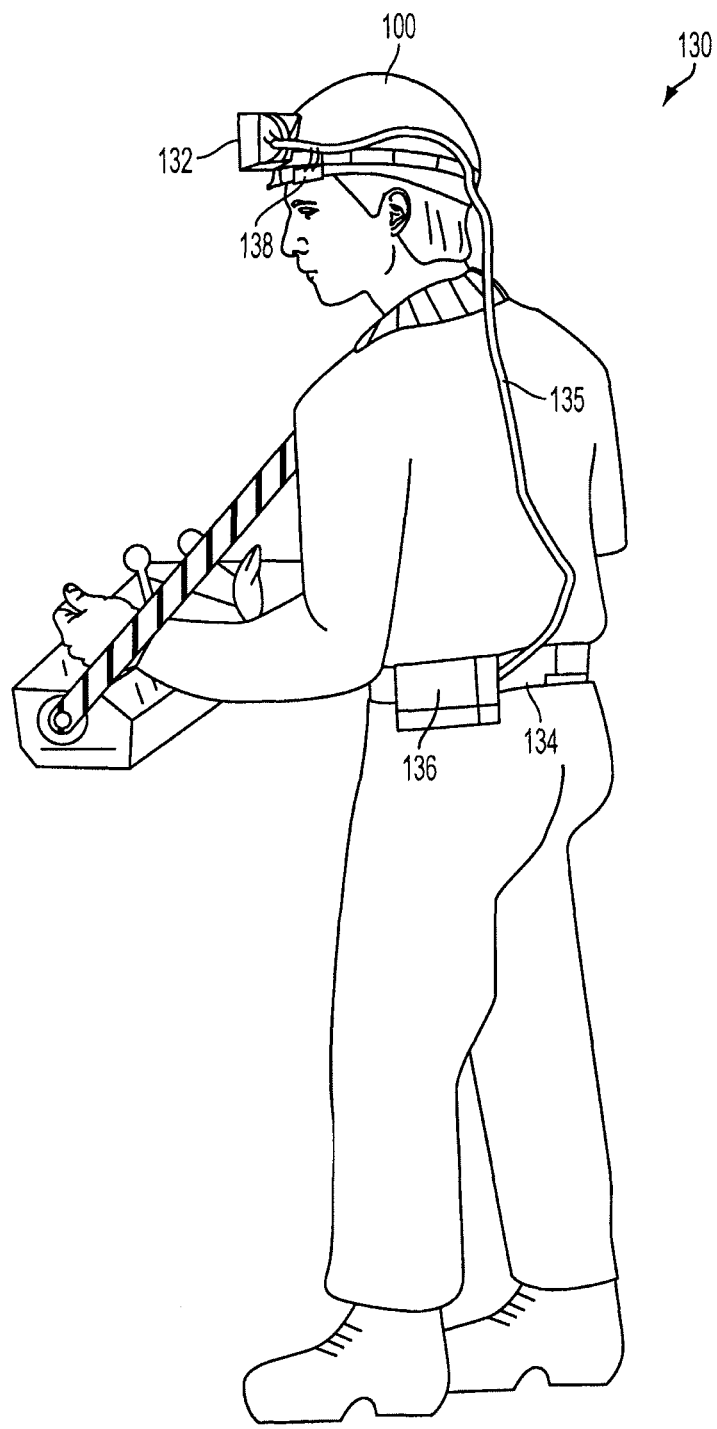
FIG. 6 is a diagram of a worker equipped with a personal alarm device/battery assembly and sounder/light assembly in accordance with an embodiment described herein.

FIG. 6 is a diagram of a worker 130 equipped with a personal alarm device/battery assembly 136 and sounder/light assembly 138 in accordance with an embodiment described herein. FIG. 6 shows a worker 130 and different embodiments of the invention in use. The worker 130 has a belt 134, and attached to the belt 134 is a personal alarm device/battery assembly 136. The worker's hat 100 has a cap light assembly 132. The cap light assembly 132 may include a switch for turning on/off the PAD/battery assembly 136. The worker's hat 100 has attached a sounder/light assembly 138 for emitting audible and/or visual alarms. The sounder/light assembly 138 communicates via a cable 135 with the PAD/battery assembly 136. The sounder/light assembly 138 is located on the hat 100 in such a position so as to be visible and audible to the worker 130 or otherwise proximate to the worker's ear and line of sight. For instance, the sounder/light assembly 138 may be mounted in various locations on the worker's hat or at other locations proximate to the worker's ear and line of sight as described above. The embodiment of FIG. 6 allows further down-sizing of the invention because only the sounder/light assembly 138 is located on the hat 100. The remainder of the personal alarm device components, including the power source, are located in the personal alarm device/battery assembly 136 which is worn on the belt 134. It should be appreciated that the personal alarm device/battery assembly may be located elsewhere on the worker 130 and is not limited to being worn on the belt 134.

The worker's hat 100 also has arranged on it a cap light assembly 132 that may be powered by the power source of the personal alarm device/battery assembly 136. The cap light assembly may also include an LED lamp to illuminate the area in front of the worker 130. In one embodiment, the cap light assembly may be integrated with the sounder/light assembly 138.

Figure 7:
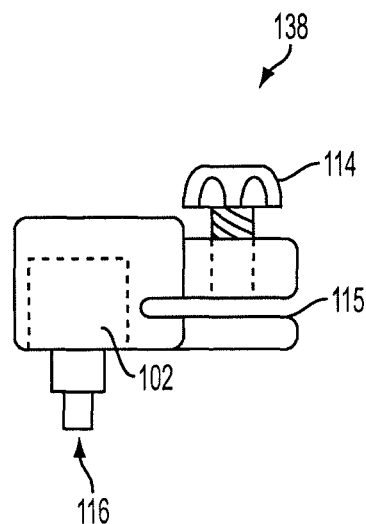
FIG. 7 is a side view diagram of the light assembly and sounder unit of FIG. 6.
Figure 8:
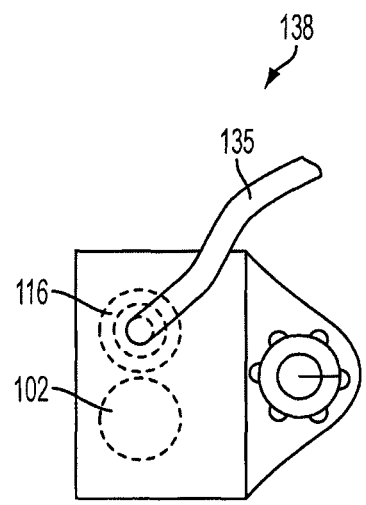
FIG. 8 is a top view diagram of the light assembly and sounder unit of FIG. 6.

FIG. 7 is a side view diagram and FIG. 8 is a top view diagram of the light assembly and sounder unit 138 of FIG. 6. The sounder/light assembly 138 may include an audible sounder 102 and LED lights 116 as described with reference to FIGS. 3 and 4, above. The sounder/light assembly 138 communicates via a cable 135 with the personal alarm device/battery assembly 136 to warn a worker of dangerous conditions. The sounder/light assembly 138 may include a thumbscrew 114 and a slot 115. In one embodiment, the slot 115 may be positioned around the brim 106 (not shown) of headwear 100 (not shown). Once the slot 115 is positioned around the brim 106, the thumbscrew 114 may be tightened by a worker 130 (not shown) to secure the sounder/light assembly 138 to the brim 106 of the headwear 100.

Figure 9:
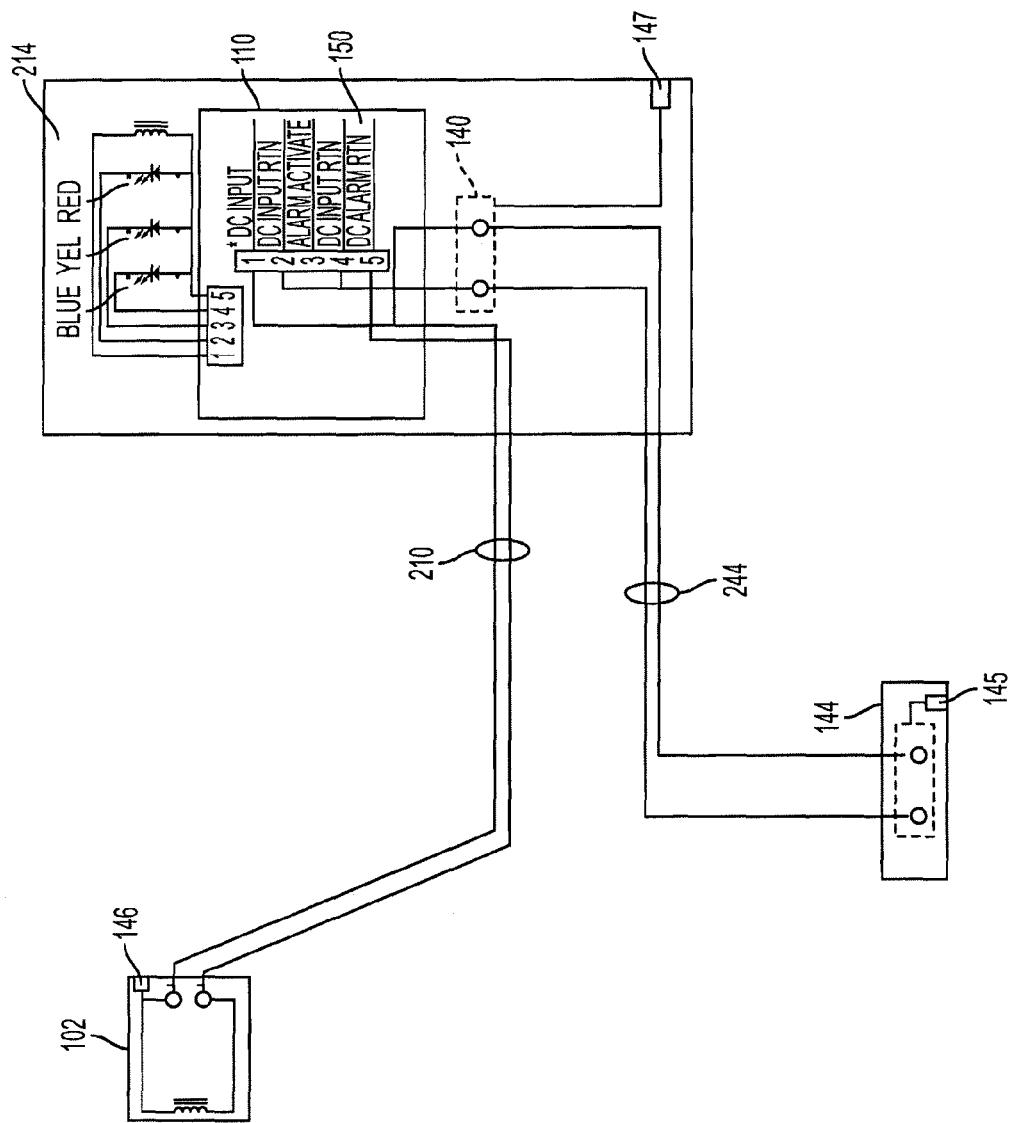
FIG. 9 is an electrical diagram of a personal alarm device in accordance with an embodiment described herein.
Figure 10:
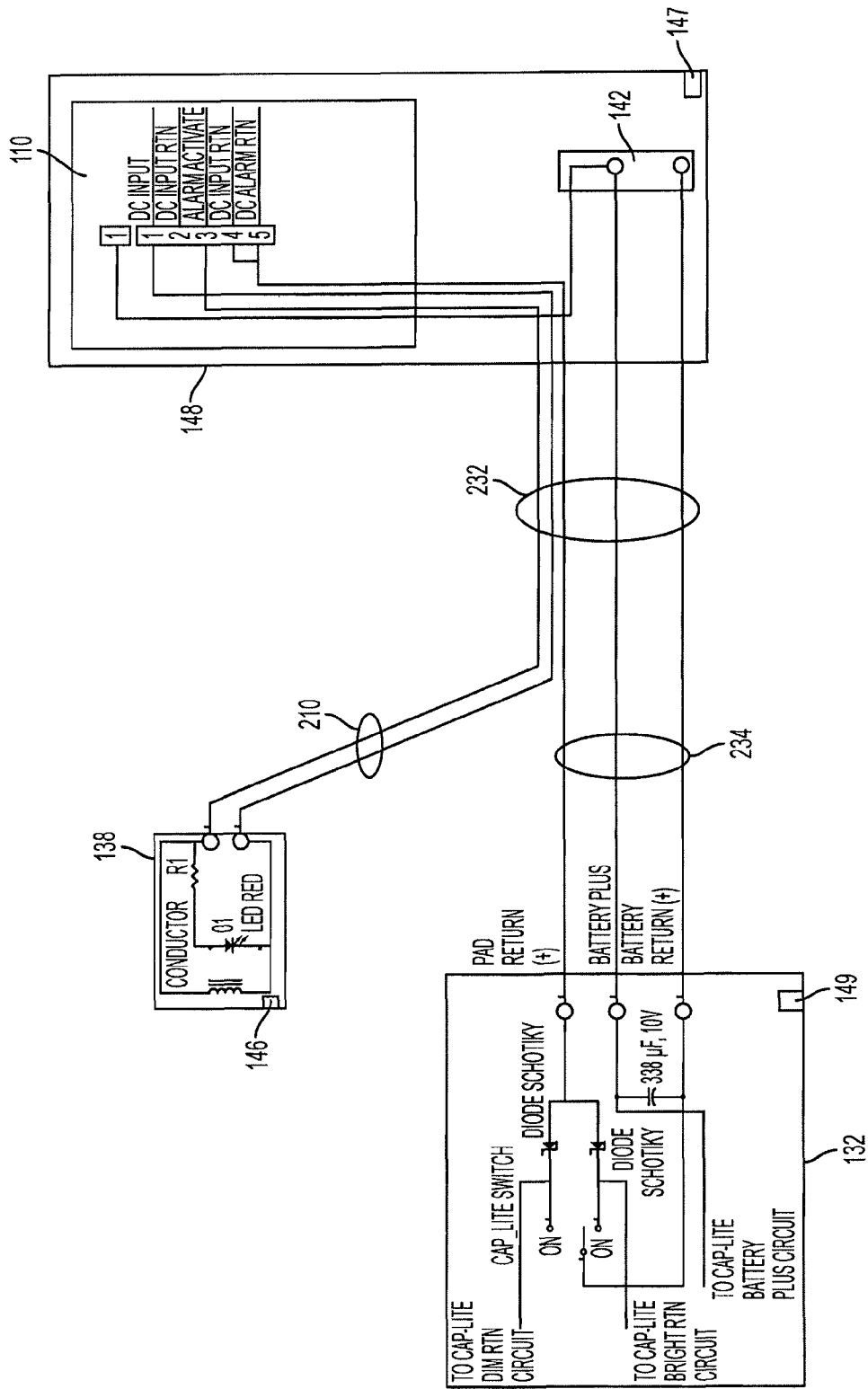
FIG. 10 is an electrical diagram of a personal alarm device in accordance with another embodiment described herein.

FIGS. 9 and 10 illustrate exemplary electrical diagrams of the various embodiments. FIG. 9 shows an electrical diagram that corresponds to the embodiments shown in FIGS. 3-5. FIG. 9 shows the personal alarm device 110, which may have an internal battery pack 140 and/or an external battery 144, which may also be a cap light battery. The external battery 144 may be worn on the worker's belt 134 (not shown), or at another suitable location and is connected to the personal alarm device 110 by an external battery cable 244. FIG. 9 also shows an external sounder 102 connected to the personal alarm device 110 by a sounder cable 210. The personal alarm device 110 may also have audio and/or visual indicators 214 that are internal to the personal alarm device 110, as discussed above with respect to FIGS. 3 and 4. In one embodiment, a charging plug may be inserted into a receptacle 145 on the external battery 144, receptacle 146 on the sounder 102, or receptacle 147 on the personal alarm device case 148 in order to recharge the external battery 144 or internal battery 140.

Figure 1:
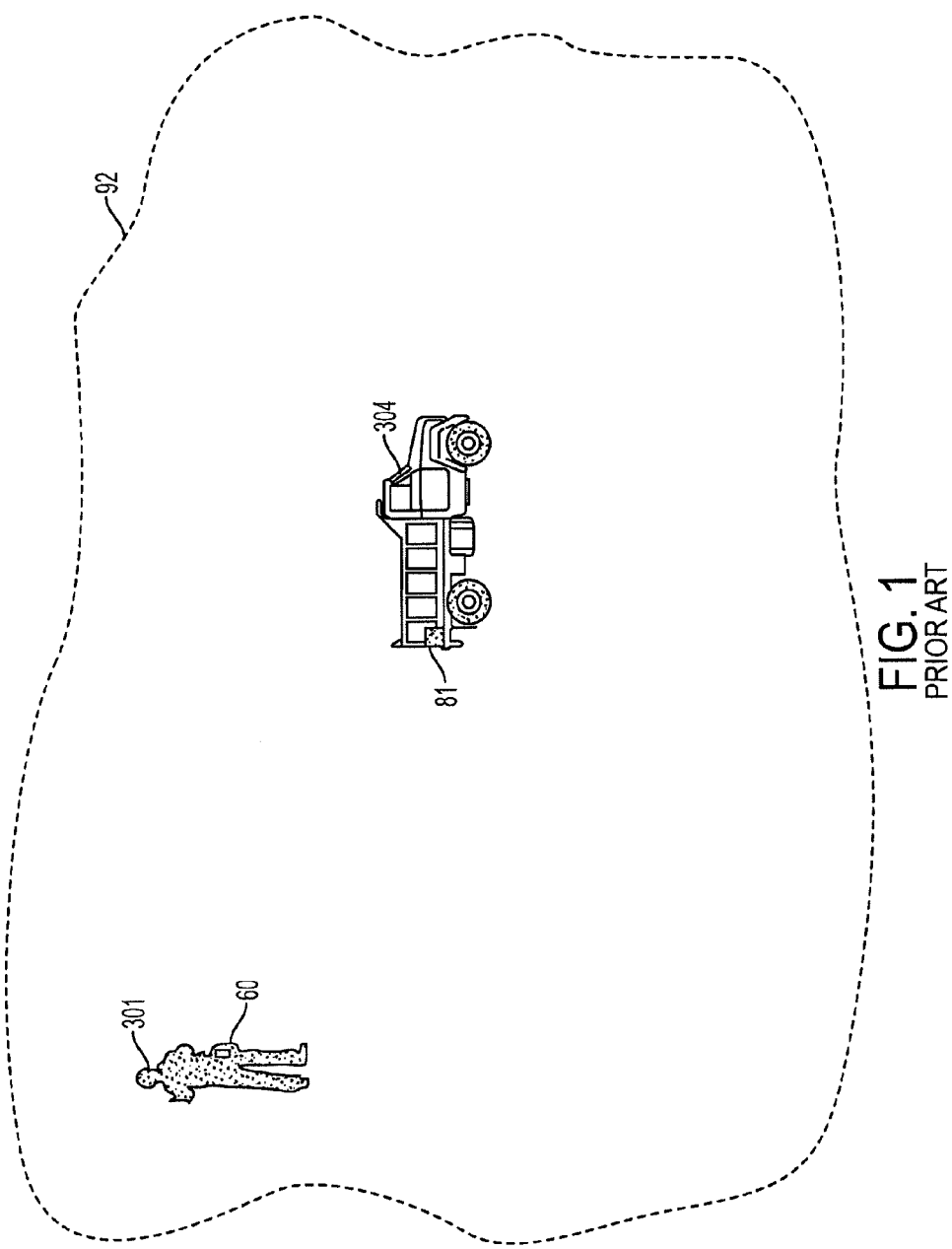
FIG. 1 is a diagram of an exemplary work site at which a proximity detection system is implemented.
Figure 2:
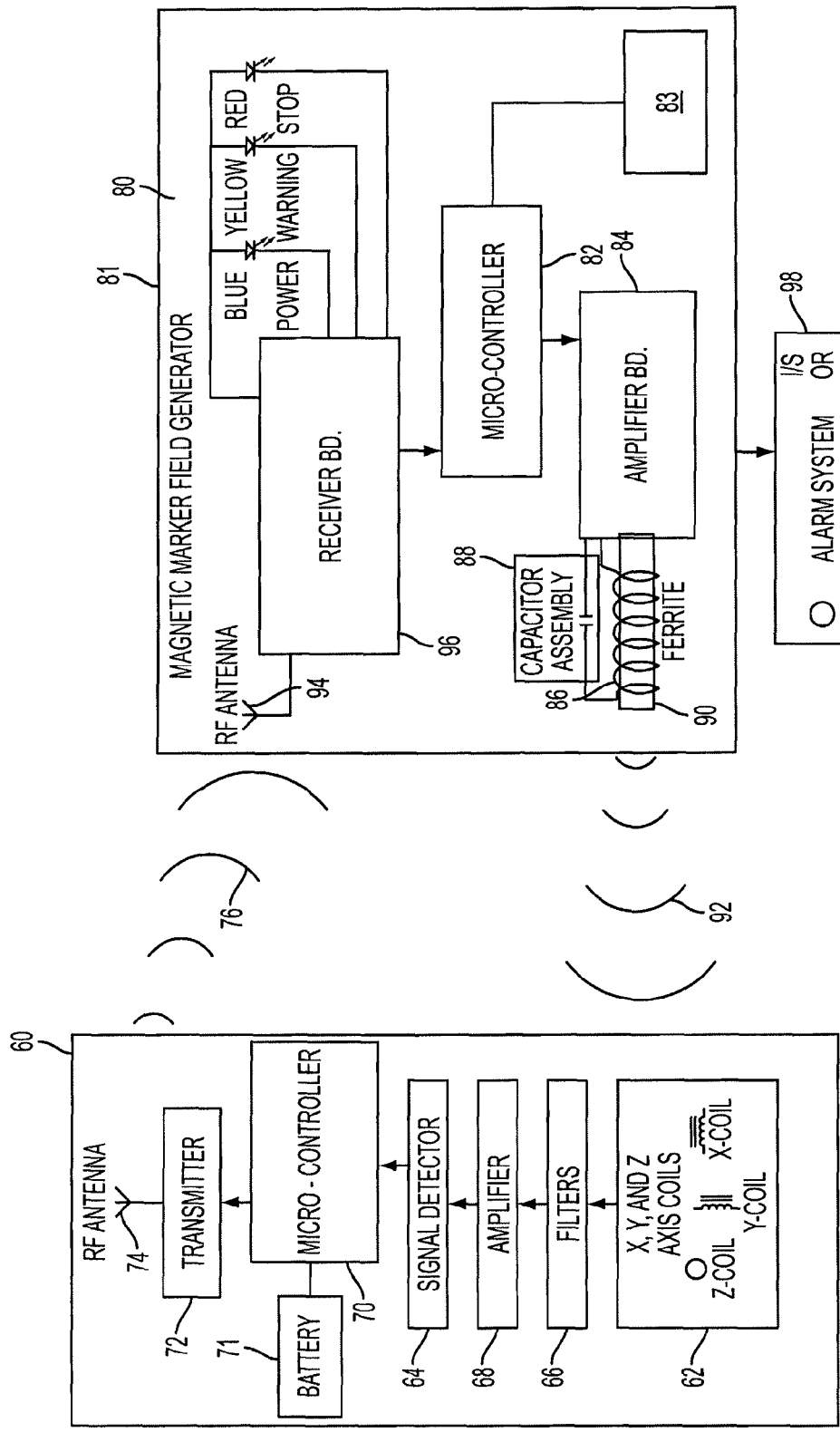
FIG. 2 is a diagram of a personal alarm device and magnetic field generator of the proximity detection system of FIG. 1.

FIG. 10 shows an electrical diagram that corresponds to the embodiment shown in FIG. 6. FIG. 10 shows the personal alarm device 110 and battery 142 housed in a personal alarm device case 148. The personal alarm device 110 is in communication with the sounder/light assembly 138 and the cap light assembly 132 through a sounder/light assembly cable 232. The sounder/light assembly cable 232 splits into a sounder cable 210 that connects to the sounder unit 138 and a cap lamp cable 234 that powers the cap lamp 132. The electrical configurations for the invention are designed to provide noise suppression utilizing hardware (e.g., filters 66 in FIG. 2)

and/or software (e.g., in the microcontroller 82 of FIG. 2). In addition, the power supplies 142 are configured to provide a constant voltage to components. In one embodiment, a charging plug may be inserted into a receptacle 147 on the personal alarm device case 148, receptacle 146 on the sounder 138, or receptacle 149 on the cap lamp 132 in order to recharge the battery 142.

Figure 11:
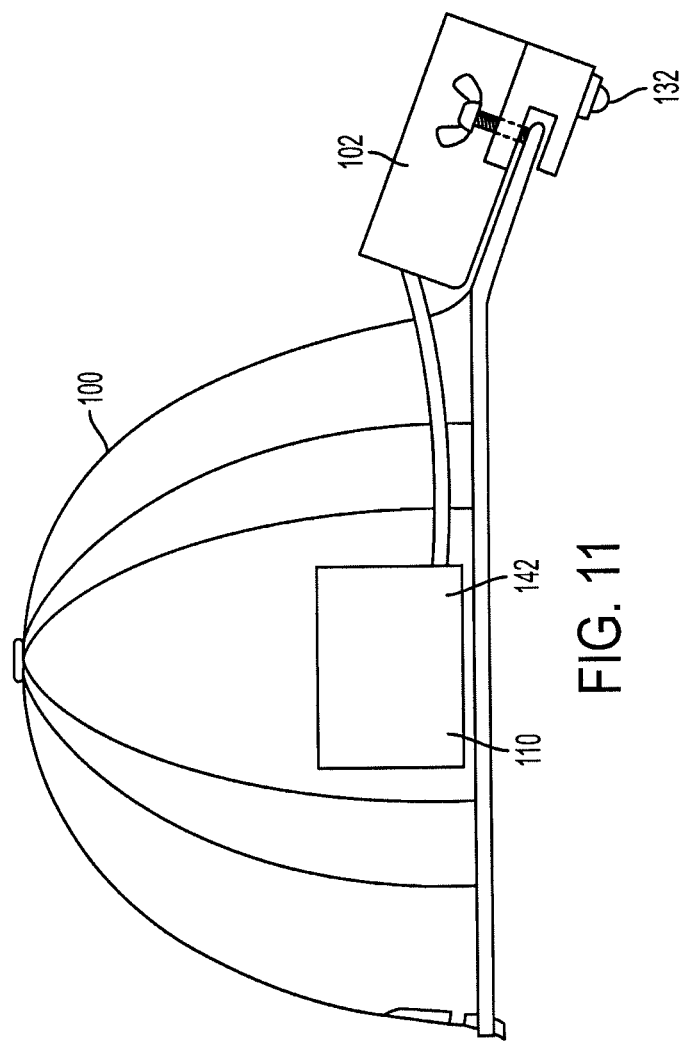
FIG. 11 is a diagram of a personal alarm device mounted on a hard hat in accordance with another embodiment described herein.

FIG. 11 is a diagram of the personal alarm device in accordance with another embodiment described herein. FIG. 11 shows a sounder 102 and cap light assembly 132 mounted on the front brim of a hardhat 100. In the embodiment of FIG. 11, the personal alarm device 110 may include an internal battery 142 and be mounted on the side of the hardhat 100. In another embodiment, the personal alarm device 110 may be mounted on the side of the hardhat 100 and an external battery pack 144 (not shown) may be mounted on the worker's belt (not shown) or elsewhere on the worker's person and connected to the personal alarm device 110 by a ribbon cable (not shown).

It should be appreciated that the personal alarm device 110, sounder 102, sounder/light assembly 138 and cap light assembly 132 may provide a variety of different warnings to the worker. For instance, the warning may be audio, visual, or tactile, such as vibrations.

Figure 12:
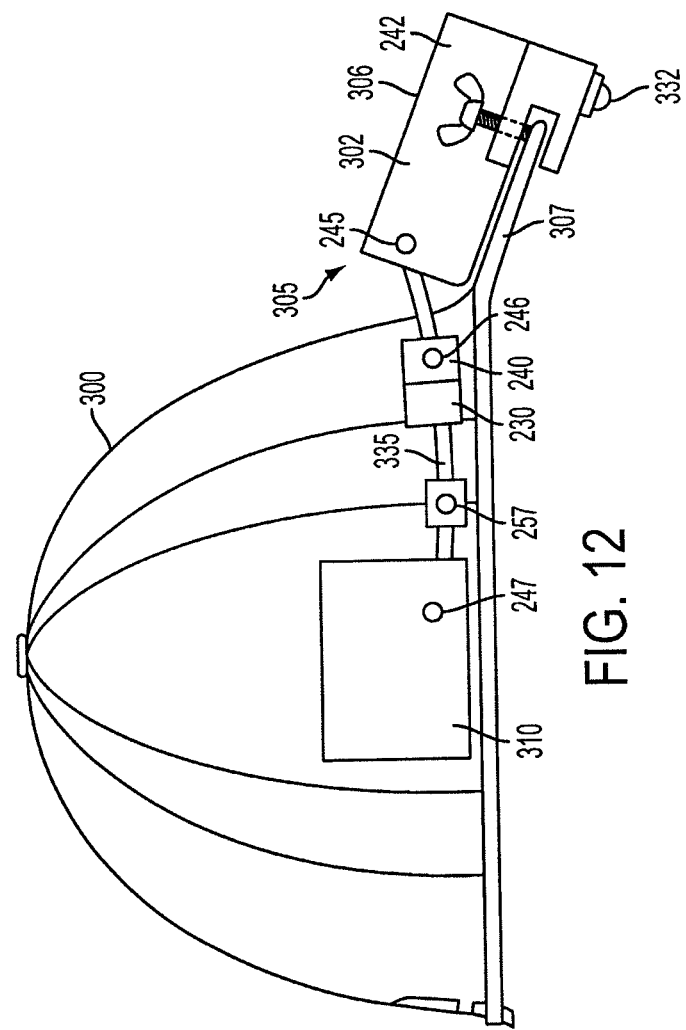
FIG. 12 is a diagram of a personal alarm device mounted on a hard hat in accordance with another embodiment described herein.

FIG. 12 is a diagram of a personal alarm device 305 mounted on a hard hat 300 in accordance with another embodiment described herein. The personal alarm device 305 includes a warning device 306 and a controller 310. The warning device 306 includes a sounder 302 and a light assembly 332 mounted on the front brim 307 of the hardhat 300. In the embodiment of FIG. 12, the warning device 306 also includes a rechargeable battery 242. The warning device 306 is connected to a controller 310 by a cable 335. The cable 335 may transfer signals and commands from the controller 310 to the warning device 306 or vice versa. In one embodiment, the cable 335 may transfer electrical power from the rechargeable battery 242 to the controller 310. In another embodiment, the controller 310 may have its own power source. The cable 335 may also have two connectors 230, 240 positioned along the cable. These connectors may be separated or joined in order to form an open or continuous connection between the warning device 306 and the controller 310. In one embodiment, warning device 306 may replaced whenever any of its components wears out, becomes damaged, or is otherwise inoperable. When it becomes necessary to replace the controller 310 or the warning device 306, the connectors 230, 240 may be separated and a new controller 310 or warning device 306 may be attached to the hardhat 300. The connectors 230 and 240 are re-joined to one another after replacing the controller 310 or the warning device 306. The warning device 306 may be separated or replaced at the same time.

In one embodiment of the invention, the controller 310 may have a battery charging receptacle 247 into which a battery charger may be connected in order to charge the battery 242. In another embodiment, a battery charging receptacle 257 may be positioned along the cable 335 in order to charge the battery 242. In yet another embodiment, a battery charging receptacle 246 may be attached to the connector 240 and/or 230. In one more embodiment, a battery charging receptacle 245 may be positioned on the warning device 306. In one embodiment of the invention, any combination of the battery charging receptacles 245, 246, 247, 257 may be used.

In the embodiment of FIG. 12, the controller 310 is attached to the side of the hardhat 300. However, in another embodiment, the controller 310 may be attached to the back, front, or elsewhere on or in the hardhat 300. In one embodiment, the warning device 306 is attached to the front of the hardhat 300. In another embodiment, the warning device 306 may be attached to the side of the hardhat 300 or anywhere else on or in the hardhat 300 where the light assembly 332 would be easily visible to a worker wearing the hardhat 300. For instance, the light assembly 332 may be mounted along the hardhat 300 in a location proximate to the line of sight of a worker wearing the hardhat 300.

The above description and drawings are only illustrative of preferred embodiments of the present inventions, and are not intended to limit the present inventions thereto.

The invention claimed is:

1. A personal alarm device comprising:
a controller; and
a warning device electrically coupled to the controller, the warning device including:
a battery,
a visual indicator positioned proximate to a worker's line of sight, and
a sounder device, wherein the visual indicator, battery and sounder device are housed in a single housing,
wherein the visual indicator emits light when the personal alarm device detects a magnetic field,
wherein an electrically conductive cable couples the warning, device to the controller, wherein the electrically conductive cable further comprises:
a first connector attached to a first end of a first part of the cable,
the controller in electrical communication with a second end of the first part of the cable,
a second connector attached to a first end of a second part of the cable, and
the warning device in electrical communication with a second end of the second part of the cable, wherein the first connector and second connector are adapted to be electrically coupled and form an electrical connection between the controller and the warning device, and
wherein the warning device is adapted to be replaced by disconnecting the first connector and the second connector, providing a second warning device in electrical communication with one end of a new second part of the cable, which has a new second connector at the other end thereof, and reconnecting the first connector to the new second connector.

2. The personal alarm device of claim 1, wherein the sounder device emits a warning sound when the personal alarm device detects a magnetic field.

3. The personal alarm device of claim 1, wherein the single housing is adapted to be attached to the worker by an attachment means.

4. The personal alarm device of claim 1, wherein the single housing is adapted to be attached to headwear worn by the worker.

5. The personal alarm device of claim 1, further comprising a light adapted to be attached to headwear worn by the worker for illuminating an area in front of the worker.

6. The personal alarm device of claim 3, wherein the attachment means is at least one of the means selected from the group consisting of an adhesive, hook and loop fastener, tape, bolt, screw, clip with thumbscrew, and spring-loaded clip.

7. The personal alarm device of claim 1, wherein the visual indicator further comprises a plurality of indicator lights.

8. The personal alarm device of claim 1, wherein the single housing is adapted to be attached to the front of headwear.

9. The personal alarm device of claim 1, further comprising a battery charging receptacle located along the electrically conductive cable.

10. The personal alarm device of claim 1, further comprising a battery charging receptacle in electrical communication with at least one component selected from the group consisting of the controller, the first connector, the second connector, and the warning device.

11. The personal alarm device of claim 8, wherein the visual indicator includes a headlamp.

12. The personal alarm device of claim 1, wherein the warning device and the second warning device are different from each other.

13. A personal alarm device comprising:
a controller; and
a warning device electrically coupled to the controller, the warning device including:
a battery, and
a visual indicator positioned proximate to a worker's line of sight,
wherein an electrically conductive cable couples the warning device to the controller, wherein the electrically conductive cable further comprises:
a first connector attached to a first end of a first part of the cable,
the controller in electrical communication with a second end of the first part of the cable,
a second connector attached to a first end of a second part of the cable, and
the warning device in electrical communication with a second end of the second part of the cable, wherein the first connector and second connector are adapted to be electrically coupled and form an electrical connection between the controller and the warning device, and
wherein the warning device is adapted to be replaced by disconnecting the first connector and the second connector, providing a second warning device in electrical communication with one end of a new second part of the cable, which has a new second connector at the other end thereof, and reconnecting the first connector to the new second connector.

14. The personal alarm device of claim 13, wherein the sounder device emits a warning sound when the personal alarm device detects a magnetic field.

15. The personal alarm device of claim 13, wherein the visual indicator emits light when the personal alarm device detects a magnetic field.

16. The personal alarm device of claim 13, wherein the single housing is adapted to be attached to the worker by an attachment means.

17. The personal alarm device of claim 13, wherein the single housing is adapted to be attached to headwear worn by the worker.

18. The personal alarm device of claim 13, further comprising a light adapted to be attached to headwear worn by the worker for illuminating an area in front of the worker.

19. The personal alarm device of claim 18, wherein the attachment means is at least one of the means selected from the group consisting of an adhesive, hook and loop fastener, tape, bolt, screw, clip with thumbscrew, and spring-loaded clip.

20. The personal alarm device of claim 13, wherein the visual indicator further comprises a plurality of indicator lights.

21. The personal alarm device of claim 13, wherein the single housing is adapted to be attached to the front of headwear.

22. The personal alarm device of claim 21, wherein the visual indicator includes a headlamp.

23. The personal alarm device of claim 13, further comprising a battery charging receptacle located along the electrically conductive cable.

24. The personal alarm device of claim 13, further comprising a battery charging receptacle in electrical communication with at least one component selected from the group consisting of the controller, the first connector, the second connector, and the warning device.

25. A personal alarm device comprising:
a controller; and
a warning device electrically coupled to the controller,
wherein an electrically conductive cable couples the warning device to the controller, wherein the electrically conductive cable further comprises:
a first connector attached to a first end of a first part of the cable,
the controller in electrical communication with a second end of the first part of the cable,
a second connector attached to a first end of a second part of the cable, and
the warning device in electrical communication with a second end of the second part of the cable, wherein the first connector and second connector are adapted to be electrically coupled and form an electrical connection between the controller and warning device, and
wherein the warning device is adapted to be replaced by disconnecting the first connector and the second connector, providing a second warning device in electrical communication with one end of a new second part of the cable, which has a new second connector at the other end thereof, and reconnecting the first connector to the new second connector.

26. The personal alarm device of claim 25, wherein the warning device includes at least one of a battery, a visual indicator positioned proximate to a worker's line of sight, and a sounder device.

27. The personal alarm device of claim 25, wherein the warning device includes a battery, a visual indicator positioned proximate to a worker's line of sight, and a sounder device, wherein the visual indicator, battery and sounder device are housed in a single housing.

28. The personal alarm device of claim 26, wherein the warning device includes a sounder device, and wherein the sounder device emits a warning sound when the personal alarm device detects a magnetic field.

29. The personal alarm device of claim 26, wherein the warning device includes a visual indicator, and wherein the visual indicator emits light when the personal alarm device detects a magnetic field.

30. The personal alarm device of claim 25, further comprising a battery charging receptacle located along the electrically conductive cable.

31. The personal alarm device of claim 13, wherein the warning device and the second warning device are different from each other.

32. The personal alarm device of claim 25, wherein the warning device and the second warning device are different from each other.

* * * * *